July 31, 1951

G. R. CRANE 2,562,377

OPTICAL SLIT SCANNING UNIT FOR
FILM REPRODUCING SYSTEMS

Filed July 7, 1949

INVENTOR
G. R. CRANE

BY

ATTORNEY

July 31, 1951

G. R. CRANE 2,562,377

OPTICAL SLIT SCANNING UNIT FOR
FILM REPRODUCING SYSTEMS

Filed July 7, 1949

INVENTOR
G. R. CRANE
BY
ATTORNEY

July 31, 1951

G. R. CRANE 2,562,377

OPTICAL SLIT SCANNING UNIT FOR
FILM REPRODUCING SYSTEMS

Filed July 7, 1949

INVENTOR
G. R. CRANE
BY
J. F. McEneany
ATTORNEY

Patented July 31, 1951

2,562,377

UNITED STATES PATENT OFFICE 2,562,377

OPTICAL SLIT SCANNING UNIT FOR FILM REPRODUCING SYSTEMS

George R. Crane, Santa Monica, Calif., assignor to Western Electric Company, Incorporated, New York, N. Y., a corporation of New York Application July 7, 1949, Serial No. 103,508

6 Claims. (Cl. 88—24)

This invention relates to sound film reproducing systems and more particularly to improvements in such systems designed for the simultaneous reproduction of a plurality of sound tracks recorded on a single film.

An object of this invention is to provide a reproducing system for a multiple sound track film in which the separate sound tracks may be simultaneously reproduced with predetermined phase displacements between the sounds reproduced from the several tracks.

Another object of this invention is the provision of a sound film reproducing system incorporating a movable scanning slit, the movement of which will produce displacement of the sound reproduction point along the sound track and in which the slit motion will be related to displacement of the reproduction point on the film.

It is a further object of this invention to provide a sound film reproducing optical system incorporating a movable scanning slit the movement of which will be such that the slit will be in optimum focus and receive equal uniform illumination in all positions in the optical system.

A feature of the invention lies in the provision of a scannng slit unit comprising a plurality of scanning slit carriers disposed across the horizontal axis of the optical system in an arc corresponding to the lateral field curvature of the optical system, each slit carrier being individually mounted on a support which controls vertical movement of the slit through a curved path corresponding to the field curvature of the optical system in the vertical plane.

In optical systems designed for the simultaneous reproduction of a plurality of photographic sound tracks recorded side by side on a single film it is sometimes necessary, in order to obtain a particular effect, to reproduce from one of the tracks at a point along that track which is advanced or retarded relative to the point of reproduction on the remaining tracks. In one particular application, for example, in a system designed for the reproduction of a multiple sound track film recorded during a seismic geophysical exploration, it is necessary to determine accurately the time delay between the recording of a particular vibration signal on all of the sound tracks.

The seismic method of geophysical exploration mentioned above depends upon the generation of a strong shock wave at or near the surface of the earth and the subsequent detection and recording of the partial reflections of this shock wave from those interfacial planes at which there occurs a sharp difference in acoustical transmission between the adjacent geological strata. The orientation and depth of the strata responsible for each of these reflections may be deduced from the mean time of arrival of the reflected wave front at the surface of the earth and the variation in arrival time at different points on the surface of the earth. Ordinarily, the detectors employed to pick up the shock wave are spaced along a straight line and in line with the source of the shock wave which is generated by an explosive charge located in a bored hole usually from 50 to 200 feet below the earth's surface. While two suitably spaced pick-ups would theoretically yield the information desired, the usual procedure is to use as many as twelve pick-ups in the same interval. The output of each of the pick-ups or detectors is suitably amplified and simultaneously recorded as separate variable area sound tracks by a multiribbon light valve or other suitable recording device. The arrival of the reflected wave front at any detector is depicted on the record as a transient of a form and duration depending upon the electrical characteristics of the recording channels. The arrival of the reflected wave front appears on the sound tracks as an echelon of transients, each transient stepped out in time from the adjacent transient by an amount determined by the inclination of the stratum responsible for the reflection. Because of the random nature of the phasing of the background noise, these noise waves, for the most part, cancel each other out thus making the transient wave produced by the reflection stand out. With the multiple sound track film thus recorded, the information desired, that is, the mean arrival time and the variation in arrival time of the reflected wave front, is obtained by reproducing the sound tracks simultaneously in an appropriate optical reproducing system provided with individual adjustable slits and separate reproducing channels for each sound track. The individual slits are then adjusted until the reflected wave front from all the tracks simultaneously appear in the output channels as determined by appropriate apparatus. The amount of movement of each slit is then read from indicator means associated with each slit adjusting device and from these readings the variation in arrival time or step-out angle is readily determined. From these determinations are obtained the dip, strike and depth of the stratum producing the reflected wave front.

It is obvious that a reproducing optical system for this use must be provided with an adjustable scanning slit unit in which each slit can be adjusted with extreme accuracy and the motion of any slit must represent a definite and uniform displacement along the sound track throughout the complete range of movement of the slit. In a practical application of the adjustable scanning slit unit in accordance with this invention, provision is made for 100-millisecond delay of any scannng slit relative to any other slit. Such mechanical accuracy is insured that the uncertainty of any scanning slit position will not exceed .25 millisecond. It is further provided that throughout the movement of any one slit, the output level shall remain constant to within one decibel and the frequency response will remain constant to within one decibel throughout the frequency range to be encountered.

This invention may be more readily understood by reference to the following specification when read in connection with the drawings in which.

Figure 1:
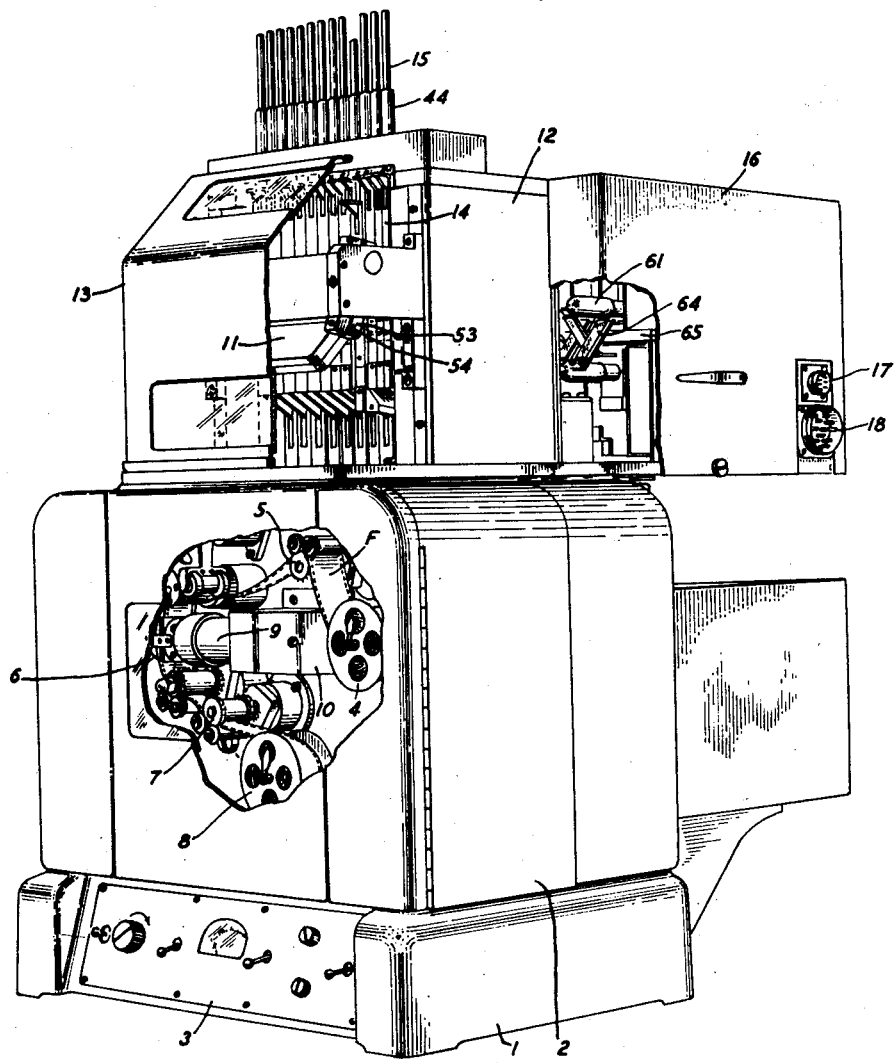
Fig. 1 is an elevation in perspective of the sound film reproducing machine employing the optical reproducing system in accordance with this invention.

Referring to Fig. 1, numeral 1 indicates a base supporting a sound film reproducing apparatus enclosed in a housing 2. The front of base 1 is provided with a sloping panel 3 on which are mounted various switches, dials and meters controlling the operation of the elements of the sound reproducing apparatus mounted in housing 2.

Within the housing 2, a multiple sound track film F is drawn from a feed reel 4 by a driving sprocket 5 and is fed, by means of guide rollers, to a fixed support 6 located at the sound reproducing point. From this point the film is drawn by a sprocket 7 and fed to a take-up reel 8. A lens tube 9 and enclosure 10 house appropriate lenses and mirror elements provided for directing a light beam upward through the top of housing 2 to a mirror 11, all of which will be explained in more detail in connection with Fig. 2.

A scanning slit unit 12, mounted on housing 2, is provided with a removable cover 13, a section of which is cut away to show the interior. This scanning slit unit is provided with thirteen slit carriers indicated at 14 which are mounted for vertical movement in a manner to be described hereinafter. Numeral 15 indicates one of thirteen control rods by means of which the position of the slit carrier 14 may be vertically adjusted. To the rear of the scanning slit unit 12 there is provided a housing 16 containing thirteen reproducing photoelectric cells and their associated amplifiers. A jack 17 provides a means of supplying operating potentials to the amplifiers and the photoelectric cells. Jack 18 is provided as a means for electrically connecting the outputs from each of the amplifiers to appropriate electrical analyzing means.

Figure 2:
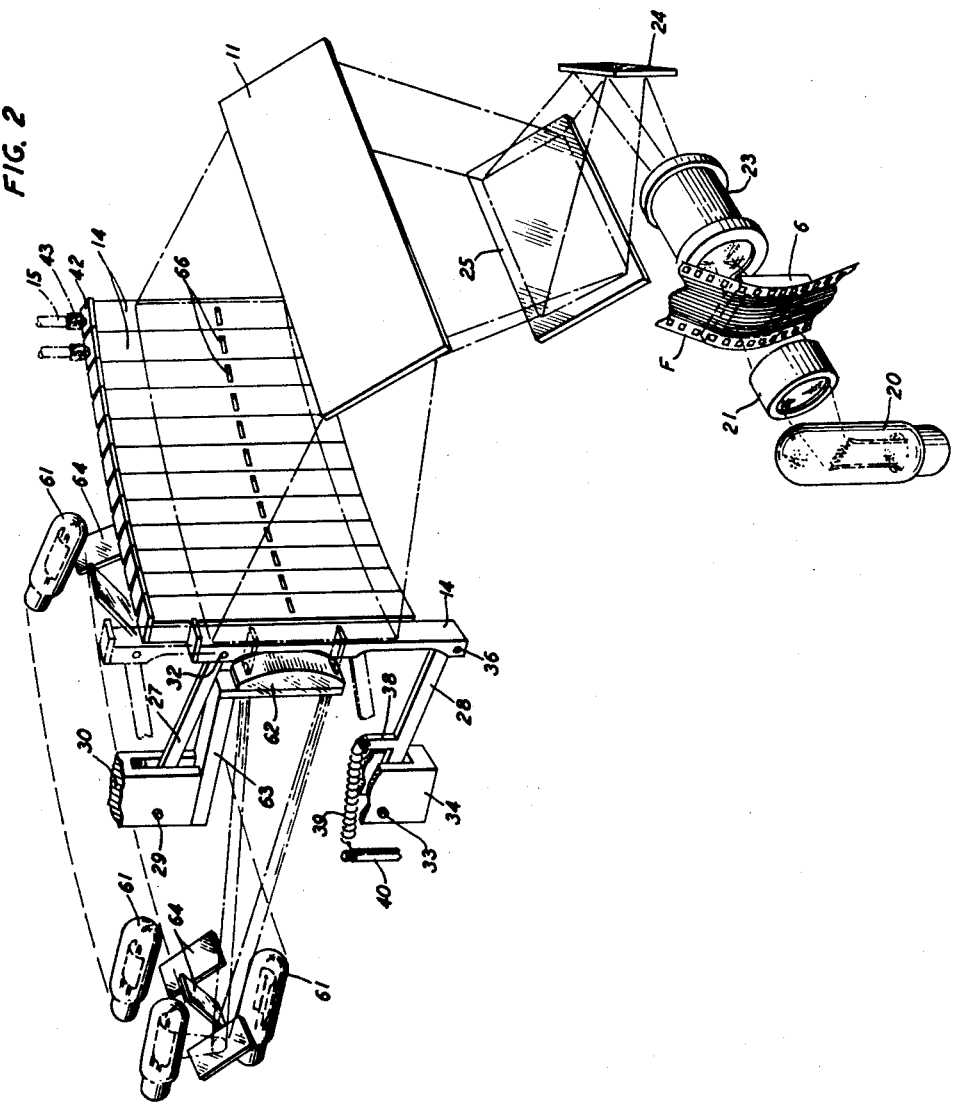
Fig. 2 is a functional schematic of the optical reproducing system in accordance with this invention.

Referring to Fig. 2, the optical reproducing system disclosed is of the type known as a "rear-scanning" optical system in which an enlarged image of an elemental area of the sound track is projected to a light defining slit located in front of a reproducing photoelectric cell. This type optical system is in general use in sound film reproducing equipment in which normally but one sound track is to be reproduced. Because of its many advantages, this type optical system has been adopted for use in the sound reproducing system designed for the reproduction of a multiple sound track film.

In any sound film optical system employing spherical lens elements and wherein the film bearing the sound track is moved through the optical system in a curved path, the image field at the scanning slit will be curved in both horizontal and vertical planes. Therefore, in a system employing a vertically adjustable scanning slit at the image plane, the amount of slit motion per unit distance on the film will vary, depending upon the position of the slit, resulting in a non-linear relationship between slit motion and displacement on the film.

In accordance with this invention, there is provided a scanning slit unit in the optical system by means of which the required accuracy of determination of phase displacements between the separate tracks may be obtained. The system in accordance with the invention provides for optimum optical resolution of each scanning slit so the scanning frequency characteristic will not be affected when any slit is moved vertically through the image field. Motion of any scanning slit in the optical system in accordance with the invention will produce a related motion of the reproducing point along its associated sound track throughout the complete range of movement of the slit.

In Fig. 2, numeral 20 indicates a sight source, the light from which is focussed into an objective lens 23 by means of a condenser lens 21. The film is guided in a curved path through the vertical axis of the optical system by the apertured film support 6 having a curved film engaging surface, as shown.

The objective lens 23 projects an enlarged image of the thirteen variable area sound tracks at the plane of the slit carriers 14. A deflecting mirror 24 directs the light beam inwardly toward the rear of the reproducing machine shown in Fig. 1. A second deflecting mirror 25 directs the light beam upward to mirror 11, the position of which is indicated in Fig. 1. This mirror 11 directs the light beam toward the scanning slits located in the slit carriers 14. As will be explained in connection with Fig. 3, mirror 11 is adjustable about its longer axis to permit alignment of the center of the enlarged image with the aligned slits in their center position on the optical axis.

Figure 3:
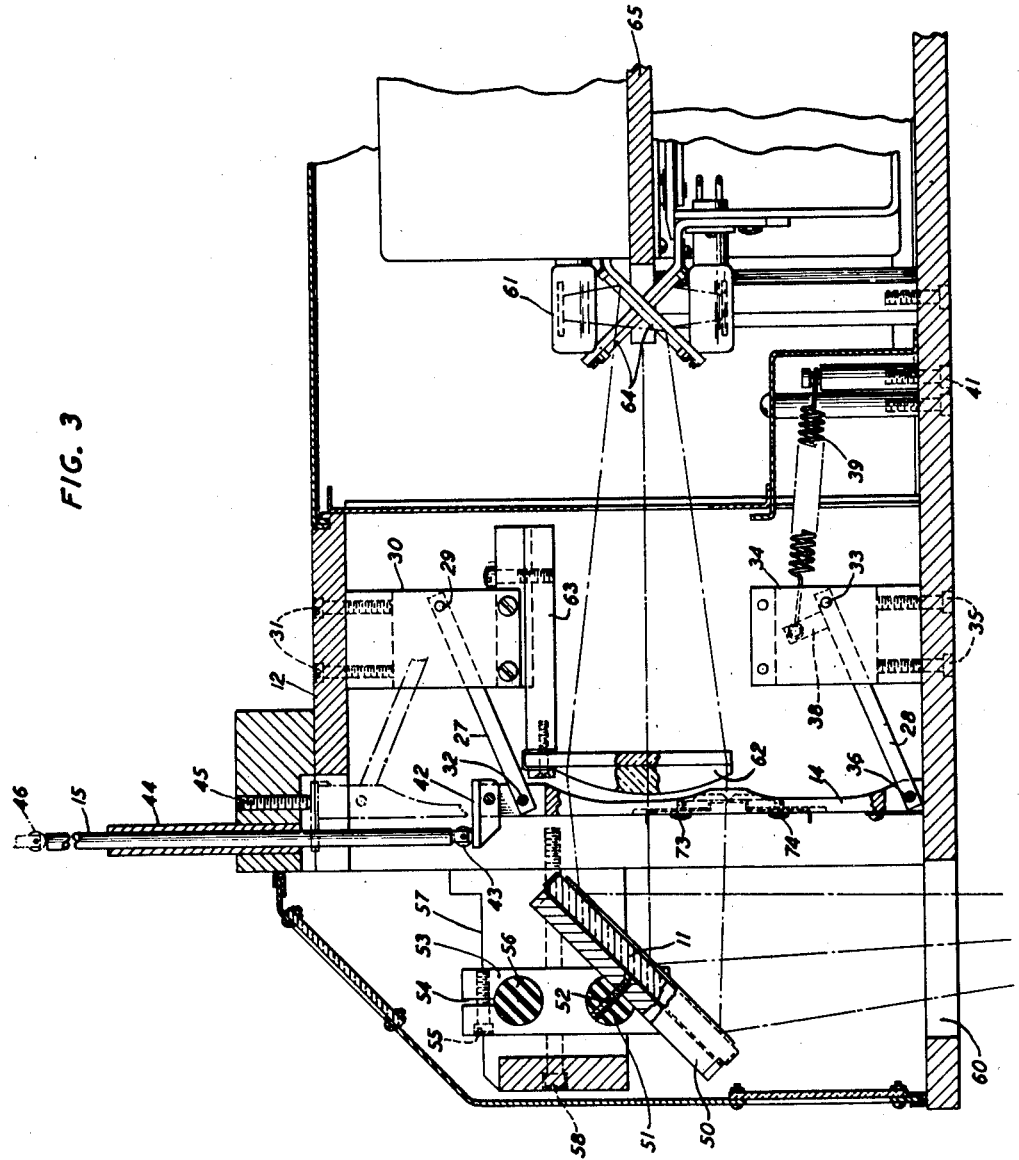
Fig. 3 is an elevation in section of the scanning slit unit.

As shown in Fig. 2, the thirteen slit carriers indicated by the numeral 14 are disposed across the horizontal axis of the optical system in an arc corresponding to the curvature of field produced by the lens elements of the optical system. As shown in Figs. 2 and 3, each of the slit carriers 14 is mounted for vertical movement by a pair of pivoted arms 27 and 28. One end of arm 27 is pivoted at 29 in a support 30 which is fixed to housing 12 by machine screws 31 (Fig. 3). The other end of arm 27 is pivoted at 32 to the upper end of carrier 14.

Lower arm 28 is pivoted at 33 in a support 34 which is secured to housing 12 by machine screws 35. The other end of arm 28 is pivoted at 36 to the lower end of carrier 14.

Each arm 28 is provided intermedate its ends with an integral upwardly extending portion 38. One end of coiled spring 39 is anchored in the end of extension 38. The opposite end of this spring is anchored to a stud 40 secured to housing 12 by machine screw 41. The upper end of each slit carrier 14 is provided with a member 42 having a flat upper surface. The spring 39 urges the slit carrier upward forcing the flat surface of member 42 against a roller 43 rotatably mounted in the end of control rod 15. The spring 39, or an equivalent means urging movement of the slit carrier may be so mounted to directly engage the slit carrier 14.

A sleeve 44 secured in the top of housing 12 provides a guide for control rod 15 which is movable vertically to adjust the vertical positions of the slit carrier 14. A set screw 45 provides a means for limiting the upward extreme of movement of the slit carrier.

The control rods 15 are moved vertically against the action of spring 39 by suitable means including a vertically adjustable surface bearing against the upper end of each control rod, as indicated schematically at 46. Means (not shown) indicating the distance of movement of the slit above or below the optical center line is associated with each adjusting device.

Referring particularly to Fig. 3, the mirror 11 is secured to a backing 50 which is in turn secured to a rod 51 by means of screw 52. The opposite ends of rod 51 are mounted in spaced members 53 one of which is shown in detail in Fig. 3. Each member 53 is split at each end as indicated at 54. Rod 51 is clamped in member 53 by means of a machine screw, as shown at 55. The position of mirror 11 may be adjusted by rotation of rod 51 and then clamped in adjusted position. The upper end of member 53 is similarly clamped to a rod 56 so that the mirror 11 and member 51 can be rotated as a unit around rod 56 for further adjustment of the mirror position. The rod 56 has its ends anchored in two support arms, one of which is indicated at 57, extending from and secured to housing 12 by machine screw 58. An opening 60 in the bottom of housing 12 permits passage of the light rays from mirror 25 to mirror 11.

Referring to the supporting arms 27 and 28 for slit carrier 14, the length of these arms is so chosen that in moving vertically under the action of spring 39, movement of the slit in carrier 14 is such that it follows an arc corresponding to the vertical field curvature produced by the lens elements of the optical system and the curvature of the film as it passes over the curved support 6. Therefore, as the slits are disposed in an arc corresponding to the horizontal curvature of field and as each slit moves vertically in an arc corresponding to the field curvature in the vertical plane, each slit will be in optimum focus at any position in the image field and its movement from any position in the field to another position will produce a definite and known displacement of the reproducing point along its associated sound track.

The light beam through each slit which has been modulated by a variable area sound track is projected to the cathode of photoelectric cell 61 as a fixed area of light varying in intensity. This is accomplished by the use of a large segment of a field lens 62 mounted on a support 63 which in turn is secured to support 30. Thirteen photoelectric cells 61 are provided, each cell having an amplifier associated therewith. The thirteen photoelectric cells are arranged in an arc corresponding to the arc formed in the horizontal plane by the thirteen slit carriers 14.

To provide mechanical clearance for the thirteen amplifiers associated with each photoelectric cell 61, a small mirror 64 is used directly in front of the cell to turn the light up or down so that alternate channel photoelectric cell amplifiers are above and below a central mounting plate 65.

Figure 4:
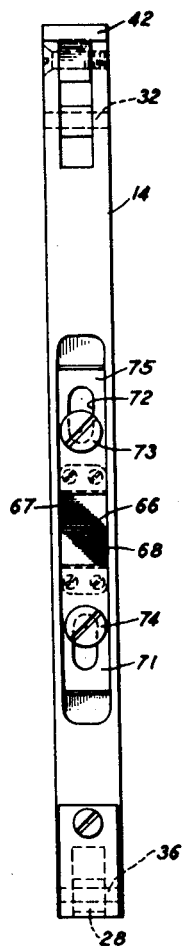
Figs. 4, 5 and 6 are detail showings of the slit carrier employed in the optical scanning slit unit.
Figure 5:
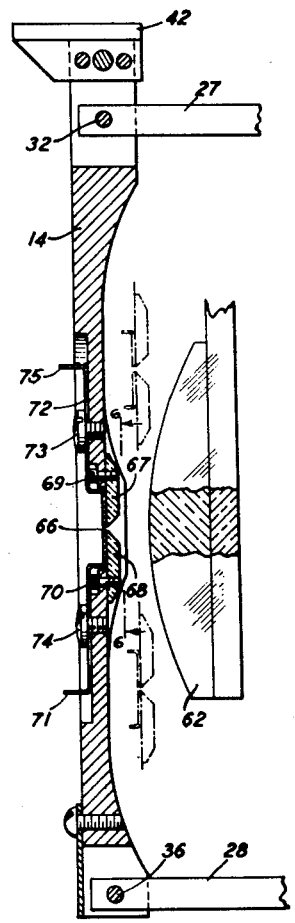
Figure 6:
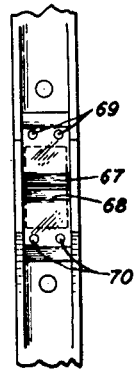

Referring to Figs. 4, 5 and 6 the slit carrier 14 is apertured at 66. Two slit forming members 67 and 68 are secured to carrier 14 by machine screws 69 and 70, respectively, and are adjustable for slit height. Means for adjusting the length of the slit by masking either end are provided in members 70 and 71, each of which is provided with a central elongated opening 72. These slit members 70 and 71 may be adjusted to the proper position by machine screws 73 and 74 respectively. By the incorporation of means for adjusting the slit height, provision is made for optically limiting the upper frequency of the frequency range to be reproduced. This feature is useful in the reproduction of sound tracks recorded during a seismic geophysical exploration as the reflected frequencies of interest are usually in the lower frequency range so that it is usually not necessary to employ a slit as narrow as that needed in the reproduction of sound.

In the seismic method of geophysical exploration described in this specification, it is usual to record twelve sound tracks of the reflected wave front and to utilize one sound track for recording timing signals generated during a recording operation. The optical reproducing system described herein provides for the reproduction of the thirteen tracks by providing thirteen scanning slits and reproducing channels.

While the invention is described generally for use in the reproduction of a multiple sound track film resulting from a geophysical exploration, it will be equally as useful in sound reproducing systems wherein it is desirable to obtain and maintain accurate, predetermined phase displacements between the sounds reproduced from the several tracks.

What is claimed is:

1. The combination of a sound film reproducing system of means producing a beam of light, a film bearing a plurality of sound tracks and movable through the vertical axis of said light beam, an optical system producing an image of all of said plurality of sound tracks, a scanning slit unit disposed in said optical system at the plane of the images of the sound tracks formed by said optical system, said scanning slit unit comprising a plurality of apertured carrier members disposed across the horizontal axis of said optical system in an arc corresponding to the lateral field curvature of said optical system, means urging vertical movement of each of said carrier members through said optical system, and individual supporting means for each of said carrier units, each of said supporting means being adapted to guide its associated carrier member through a curved path corresponding to the curvature of field of said optical system at the image plane.

2. The combination in a system for the reproduction of a photographic sound record, of an optical system producing an image of said record, an adjustable slit unit comprising a carrier having a slit therein and disposed at the plane of the image formed by said optical system, means urging vertical movement of said carrier through said optical system, vertically adjustable means engaging said carrier to oppose the movement thereof under the action of said means for urging vertical movement, and means associated with said carrier for guiding the movement thereof through a curved path corresponding to the curvature of field of the optical system at the image plane.

3. The combination in an optical system for the reproduction of a photographic film sound record, of an adjustable slit unit comprising a carrier having a slit therein, means supporting said carrier, said means supporting said carrier comprising a pair of pivoted arms, each of said arms having one end engaging one end of said carrier, means urging vertical movement of said carrier in said optical system, said pivoted arms being of such length that said carrier is guided thereby through a curved path corresponding to the field curvature of said optical system along the vertical axis thereof.

4. The combination in a system for the reproduction of a photographic sound record, of an optical system forming an image of said photographic sound record, a scanning unit disposed in said optical system, said scanning unit comprising a housing, a vertically movable adjusting means extending through the upper wall of said housing, a rotatable bearing surface mounted in the end of said adjusting means within said housing, a slit carrier disposed within said housing at the plane of the image of said sound track and provided with an enlarged flat bearing surface at its upper end, spring means associated with said carrier in a manner to urge upward vertical movement of said carrier against the rotatable bearing surface on said adjusting means, a pair of spaced arms each having one end pivoted at said carrier and the other end pivoted to said housing, said arms being of a length such that they control vertical movement of said slit carrier in a curved path corresponding to the curvature of field of the optical system in the vertical axis.

5. The combination in a system for reproducing a photographic sound record, of an optical system producing an image of said sound record, a scanning slit unit comprising a housing, a carrier having a slit therein, said carrier disposed within said housing and positioned at the plane of the image of said sound record, vertically adjustable means extending through said housing and in contact with an end of said carrier, means within said housing urging vertical movement of said carrier against said adjustable means, and supporting means associated with said carrier for guiding the vertical movement thereof through a curved path corresponding to the vertical field curvature of said optical system.

6. The combination in a system for the reproduction of a multiple sound track photographic film, of an optical system producing an enlarged image of said sound tracks, a scanning slit unit comprising a housing, a plurality of carriers each having a slit therein, said slit carriers being disposed in said housing at the plane of the image formed by said optical system in an arc in the horizontal plane of said optical system corresponding to the horizontal field curvature of the image, a plurality of vertically movable adjusting members extending through said housing, each of said adjusting members engageable with an end of one of said carriers, means individual to each of said carriers urging vertical movement thereof against said adjusting members, and means individual to each of said carriers for guiding the vertical movement of said carriers through a curved path corresponding to the curvature of field in the vertical plane of said optical system.

GEORGE R. CRANE.

REFERENCES CITED

The following references are of record in the file of this patent:

UNITED STATES PATENTS

| Number | Name | Date |
|---|---|---|
| 1,781,550 | Kwartin | Nov. 11, 1930 |
| 1,833,074 | Foster | Nov. 24, 1931 |
| 1,833,075 | Foster | Nov. 24, 1931 |
| 1,987,205 | Nakken | Jan. 8, 1935 |
| 2,021,232 | Fassin | Nov. 19, 1935 |
| 2,223,334 | Robison | Nov. 26, 1940 |
| 2,272,795 | Dimmick | Feb. 10, 1942 |
| 2,323,372 | Bryce | July 6, 1943 |
| 2,417,227 | Wolf | Mar. 11, 1947 |
| 2,427,421 | Rieber | Sept. 16, 1947 |